United States Patent [19]
Walles

[11] 3,856,172
[45] Dec. 24, 1974

[54] VACUUMIZED PLASTIC CAP FOR HEAT INSULATING CONTAINERS

[75] Inventor: Wilhelm E. Walles, Midland, Mich.

[73] Assignee: The Dow Chemical Company, Midland, Mich.

[22] Filed: Aug. 20, 1973

[21] Appl. No.: 389,748

[52] U.S. Cl. .............. 215/364, 220/23, 220/24 H, 215/13 R
[51] Int. Cl. .................... B65d 39/08, A47j 41/02
[58] Field of Search........ 215/12 A, 13 R, 261, 364; 220/24 H, 23

[56] References Cited
UNITED STATES PATENTS

| | | | |
|---|---|---|---|
| 2,361,555 | 10/1944 | McWhorter | 220/24 H |
| 2,643,021 | 6/1953 | Freedman | 215/13 R |
| 2,944,690 | 7/1960 | Darmstadt | 215/13 R |
| 3,081,137 | 3/1963 | Kalokythar | 220/23 |
| 3,298,559 | 1/1967 | Lurie | 229/3.5 MF |

*Primary Examiner*—Herbert F. Ross
*Attorney, Agent, or Firm*—Richard G. Waterman; Michael S. Jenkins

[57] ABSTRACT

Heat insulative properties of vacuum containers such as vacuum bottles are significantly improved by stoppering the container with a vacuumized plastic cap having a boundary wall of structural plastic material wherein the inner surface of the boundary wall is coated with a thin metallic layer and a layer of barrier plastic such as a vinylidene chloride copolymer and which encloses an evacuated space filled with a gas absorbing material such as activated charcoal.

7 Claims, 1 Drawing Figure

PATENTED DEC 24 1974　　　　　　　　　3,856,172

VACUUMIZED PLASTIC CAP FOR HEAT INSULATING CONTAINERS

BACKGROUND OF THE INVENTION

This invention relates to stoppers for vacuum containers having heat insulative properties.

Vacuum bottles and vacuum containers formed of glass or steel are well known. Such containers are generally characterized by a double wall construction of glass or steel enclosing an evacuated space to provide heat insulative properties useful in storing hot or cold materials in a receptacle surrounded by the double wall construction. Conventionally, such containers which are open at one end for filling with material to be stored at desired temperature are stoppered with a wide variety of caps such as corks, rubber stoppers, hollow plastic caps, plastic caps filled with cork pieces and plastic caps filled with foam. In the case of most vacuum bottles having generally good heat insulative properties, the cap or stopper is accountable for over one-half of total heat passing through the bottle. With the present popularity of wide-mouth bottles requiring larger caps or stoppers, a real need has arisen to provide heat insulating vacuum containers with improved insulating caps.

SUMMARY OF THE INVENTION

The present invention is a vacuumized plastic cap having substantially improved heat insulative properties. In addition, the plastic cap exhibits considerable resistance to breakage and retains excellent heat insulative properties for periods lasting up to five years and longer.

More specifically, the vacuumized plastic cap comprises a boundary wall of a normally solid plastic material enclosing an evacuated space, a layer of metal on at least one surface of said boundary wall, an overcoating of a barrier plastic adherent to the metal layer and a gas absorbing material residing in the evacuated space enclosed by the boundary wall. The vacuumized, plastic cap is provided by metallizing at least one surface of the boundary wall and coating the metallized surface with barrier plastic. The enclosed space is subsequently evacuated, filled with gas absorbing material and sealed to provide the desired vacuumized cap.

Surprisingly, it is found that the vacuumized, plastic cap of the present invention substantially improves the heat insulative properties of vacuum containers which were previously stoppered with cork or foam insulated plastic caps.

The plastic caps of the present invention are useful in stoppering heat insulating, vacuum containers fabricated of a wide variety of materials such as glass, steel, and plastic.

DETAILED DESCRIPTION OF THE EMBODIMENTS

Figure 1:
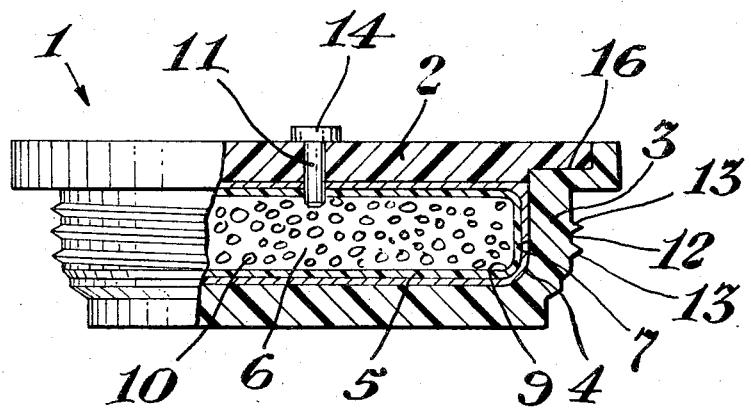
FIG. 1 is an elevational view, partially in section, of a preferred plastic cap of the invention.

In FIG. 1, there is depicted a preferred plastic cap having a boundary wall 1 of a normally solid plastic material which encloses an evacuated space 6. The boundary wall 1 advantageously comprises two sections: first, a closure portion 3 which is to be inserted into the mouth of heat insulating vacuum container, and second a lid portion 2 which is welded or otherwise sealed along weld line 16 to closure portion 3. On inner surface 7 of wall 1, there is deposited a metal layer 4. On surface 9 of metal layer 4, there is deposited a layer 5 of a barrier polymer. Occupying at least a portion of space 6 is a gas absorbing solid particulate 10 for capturing gases present in evacuated space 6 as a result of incomplete evacuation of the space, gases resulting from outgassing of the plastic material and barrier polymer and gases which permeate the combined boundary wall metal layer and barrier polymer layer. The exterior surface 12 of boundary wall 1 preferably has screw flights 13 to enable screwing of the cap into the heat insulating container. Lid portion 2 has opening 11 through which the gas-absorbing solid particulate 10 can be inserted into space 6 and gases occupying space 6 can be removed. Advantageously, metal layer 4 and barrier polymer layer 5 are also applied through opening 11 as described hereinafter. A plug 14 stoppers opening 11 after space 6 is evacuated such that a hermetic seal between space 6 and the atmosphere is maintained.

Plastic materials suitable for use in the boundary wall are those normally solid, organic polymers that are readily shaped or molded or otherwise fabricated into the desired container form and possess sufficient rigidity to retain said form under conditions to which they will be exposed. Preferably, the polymers are thermoplastic and are relatively inert to those materials which are to be contained by the heat insulating container. Because of their lower cost and superior structural properties, polymers used in structural applications, so-called engineering plastics, such as polystyrene, styrene/acrylonitrile copolymers, styrene/butadiene copolymers, styrene/butadiene/acrylonitrile copolymers, rubber modified styrene polymers, styrene/maleic anhydride copolymers and other polymers of monovinylidene aromatic carbocyclic monomers are generally preferred. Other polymers which may be suitably employed are acetal plastics such as polyformaldehyde resin, polyolefins such as polypropylene and polyethylene, polycarbonates, polyamides, such as nylon, rigid polyvinyl chloride, polyesters such as poly(ethylene terephthalate), acrylic resins such as poly(methyl methacrylate), polysulfone and the other normally solid polymers which can be formed into the desired shape by conventional forming techniques, e.g., blow molding and injection molding. Of special interest, particularly for forming the portion of the boundary wall which will contain hot liquids, are the high temperature resistant plastics such as styrene/maleic anhydride copolymers, including their rubber modified variations, and other such polymers, including imide and lower N-alkyl imide forms. Such polymers of special interest are further described in U.S. Pat. No. 3,336,277 to Zimmerman et al., U.S. Pat. No. 3,401,153 to Zimmerman et al., Pat. No. 2,838,475 to Barrett and Pat. No. 2,971,939 to Baer. In addition to the foregoing polymers, the boundary may also contain one or more additaments such as fillers, stabilizers, surface modifiers, gas-absorbing materials, dyes and the like.

Because injection molding or similar procedures are preferred in fabricating the boundary wall, the plastic materials are preferably thermoplastic. However, thermosetting polymers can also be used. As a general rule, all synthetic polymers, whether thermoplastic or thermosetting, are incapable of retaining a high vacuum for an extended period. Accordingly, plastic materials usually employed in the boundary wall exhibit a degree of permeability to gases of the atmosphere such that a vacuum of $10^{-1}$ mm Hg cannot be maintained in containers fabricated solely of such plastic materials.

The boundary wall has thickness in the range of about 20 to about 300 mils preferably from about 50 to about 100 mils. The wall should be generally thicker within said range when polymers somewhat lower in high temperature resistance are employed. Therefore it is understood that the wall thickness is suitable if it provides the cap with sufficient strength to withstand deformation under normal conditions. The boundary wall is formed into desired shape by conventional polymer shaping techniques such as injection molding and combinations thereof with blow molding. It is understood that the boundary wall may be formed by molding the wall in two or more parts and then welding the parts together. In such instances, the welded portions of wall may comprise different polymers. For example, as shown in FIG. 1, the interior closure portion of wall which may contact the liquid or solid material being stored may comprise high temperature resin such as styrene/maleic anhydride and the exterior lid portion of the wall may comprise a general purpose resin such as styrene/acrylonitrile coplymer.

The metal coating which imparts partial barrier characteristic to the boundary wall suitable comprises silver, lead, nickel, aluminum, copper, gold, titanium, tin, bismuth, antimony, chromium, manganese, iron, cobalt, metals of the platinum group and alloys of two or more of the aforementioned metals. Preferably the metal coating comprises silver, nickel or alloy thereof.

Metallization is preferably carried out by first rendering the wall surface of the plastic water wettable and subsequently plating metal on the surface with an electroless process such as the processes described by F. A. Lowenheim in "Metal Coating of Plastics," Noyes Data Corporation (1970). See also Pinner, S. H., et al., "Plastics: Surface and Finish," Daniel Davey & Co., Inc., 172–186 (1971) and Pat. No. 2,464,143. Preferably, the wall surface is rendered water-wettable by a gas phase sulfonation process as described in Pat. No. 3,625,751 to Walles. It is understood however, that other methods for rendering polymers water-wettable such as corona discharge, liquid phase sulfonation, etc., are also suitable. Other techniques for metallizing plastic surfaces such as electroplating can be suitably employed although such other techniques are not as desirable as the electroless plating techniques.

The quantity of metal deposited in forming the desired metal layer is that amount which forms an essentially continuous film over the desired surface of the boundary wall and thereby renders the wall partially impermeable. Preferably the quantity of metal deposited is in the range from about 2 to about 11,000 micrograms per square centimer ($\mu g/cm^2$), especially from about 10 to about 500 $\mu g/cm^2$. Corresponding thicknesses of the metal layer are about 0.002 to about 110 micrometers, preferably about 0.01 to about 0.5 micrometer. The metal layer should be essentially continuous and extensive enough such that the evacuated space is essentially enclosed by the metal layer. Suitably, the metal layer is applied to at least about 95 percent of the total area of the boundary wall surface proximate to the evacuated space (hereinafter referred to as the inner surface), preferably to at least 99 percent. It is understood that the metal layer is composed of metal crystals with some open spaces therebetween. Alternatively or in addition, the metal layer may be applied to the outer surface of the boundary wall, i.e., surface distant from the evacuated space, although such practice is not as preferred as applying the metal layer to the inner surface of the boundary wall.

For the purposes of this invention, a barrier plastic is a normally solid, organic polymer that exhibits a permeance to gases of the atmosphere of less than about 6 cubic centimeters/100 square inches/mil of thickness/day under 1 atmosphere pressure difference and at room temperature (cc/100 square inches/mil/day), preferably less than about 0.9 cc/100 square inches/mil/day. The suitable barrier plastics can be formed into essentially continuous films which can be readily adhered to metal surfaces. Exemplary barrier plastics are vinylidene chloride/vinyl chloride copolymers, vinylidene chloride/acrylonitrile copolymers, and copolymers of such monomers as acrylonitrile, methacrylonitrile, methyl acrylate, methyl methacrylate and acrylamide. It is further understood that blends of such polymers are also suitable. Preferably the barrier plastics are the vinylidene chloride copolymers, especially those described in Pat. No. 3,617,368 to Gibbs et al.

The barrier plastics are preferably applied to the metal coatings in the form of latexes which form essentially continuous films upon drying at temperatures below the heat distortion point of the plastic material of the boundary wall. Heat distortion point of a polymer is the minimum temperature at which an article fabricated of the polymer distorts as a result of the tendency of the polymer to resume its prefabrication shape and/or as a result of minimal outside force. It is understood, however, that other forms of the barrier plastic such as solvent coatings, non-aqueous dispersions and powders are also suitably employed. Coating techniques such as dipping, spraying, powder coating, plasma jet and glow discharge and the like are suitable for applying the barrier plastic to the metal layer.

The quantity of the barrier plastic applied to the metal layer is in the range from about 6 to about 12,000 $\mu g/cm^2$, preferably from about 60 to about 5,000 $\mu g/cm^2$. Corresponding thicknesses of the coating of barrier plastic are in the range from about 0.025 to about 62.5 micrometers, preferably from about 0.25 to about 25 micrometers. The coating of barrier plastic should be extensive enough to essentially enclose the evacuated space. Advantageously, the barrier plastic coating is applied to at least about 95 percent of the total area of the metal layer, preferably at least about 99 percent.

A gas absorbing material is added to the enclosed space prior to or after vacuumization of the space, preferably after evacuation. Usually, the gas absorbing material is a finely divided solid or mixture of finely divided solids such as carbon black and activated charcoal powder, diatomaceous earth and other carbonaceous powders resulting from pyrolysis and/or steam activation of organic materials such as coconuts, corn husks, sugar; powdered metals and metal oxides and hydroxide, e.g., barium, lithium, sodium hydroxide, calcium oxide; metal silicates, calcium silicate, magnesium silicate, and finely divided, high surface area silica, titania ($TiO_2$) and alumina ($Al_2O_3$). Generally porous powders of gas absorbing solids having an average surface area of 100–2000 square meters per gram are desirable. Most advantageously, the powder has an average particle size in the range from about $10^{-2}$ to about 10 micrometers. The amount of powder employed usually ranges from very small quantities such as about 0.3 gram up to large quantities which substantially fill the volume of the enclosed space. It is understood that the gas absorbing solids capture atmospheric gases by both physical adsorption and chemical absorption mechanisms.

The space enclosed by the boundary wall is evacuated by a conventional vacuum pump such as one of a type used in evacuating conventional vacuum-insulated containers.

Following the addition of the gas absorbing material to the enclosed space or evacuation of the enclosed space, whichever occurs later, the opening or openings through which the material is added and the vacuum is drawn are sealed such that a vacuum is retained (so-called hermetic seal). Conventional techniques for sealing or fusing parts fabricated of plastic materials can be adopted to seal the boundary wall. Preferably, however, a portion of the cap in the form of a plug or disk of a plastic material similar to or at least fusible with the plastic material of boundary wall is inserted into an opening into the enclosed space defined by the remainder of the boundary wall and rotated until friction between the portion and the surfaces proximate to the opening fuses the portion to the remaining boundary wall and thereby forms a hermetic seal. Alternatively, the portion may be sealed into the opening by ultrasonic welding means or by using an adhesive such as an epoxy resin. Such sealing operation is carried out under vacuum, preferably as disclosed in copending application, Ser. No. 346,444 filed Mar. 30, 1973.

It is understood that the cap of the present invention may have a design substantially different from the insert cap disclosed in FIG. 1. For example, the cap may have the form of an overcap or a combination overcap and insert cap.

The following examples are given for purposes of illustrating the invention and should not be construed as limiting its scope. All parts and percentages are by weight unless otherwise indicated.

EXAMPLE 1

Surface Treatment

The boundary wall of hollow polypropylene cap as depicted in FIG. 1 having a wall thickness of 75 mils is made by welding the lid portion 2 to the closure portion 3 using ultrasonic vibration. The surface of the boundary wall enclosing the hollow space is sulfonated to a degree of 1 microgram of sulfur trioxide equivalents per square centimeter by passing dry air containing two percent sulfur trioxide gas through the opening 11 in the lid portion 2 into the enclosed space at 25°C for the period of one minute.

Metallization

A metallizing liquid is prepared by mixing one part each of the following solutions:
A. 0.60 percent $Ag(NH_3)_2NO_3$ in water, and
B. 0.30 percent NaOH, 0.15 percent glucose, and 0.15 percent fructose in water.

Immediately after the solutions (A) and (B) are mixed, a small amount of the mixture is injected through opening 11 into the enclosed space 6 of the cap and silvering is completed within one minute. The silvered surface is then rinsed with water. The silver coating has a coating density of 100 micrograms per square centimeter which corresponds to a coating thickness of about 0.1 micrometer.

Application of Barrier Plastic

The silvered surface of the cap is overcoated with a barrier plastic by injecting into the cap through opening 11 a 50 percent solids latex of vinyl chloride/acrylonitrile/sulfoethyl methacrylate (90/8/2) terpolymer, said latex having an average particle size of about 0.22 microns. The terpolymer has a permeance to the atmosphere which is less than 0.9 cc/100 square inches/mil/day. Thereafter, the cap is inverted and excess latex is allowed to run out the enclosed space 6 through opening 11. The cap is then dried at 60°C for 15 minutes. The dried coating of barrier plastic has a coating thickness of 25 micrometers (~1 mil).

Evacuation, Addition of Gas Absorbing Particulate and Sealing

The space enclosed by the cap is evacuated to a pressure of 0.001 mm Hg, and 30 grams of activated charcoal having an average particle size of 0.2 microns is added through opening 11 to the enclosed space under vacuum. Prior to addition of the charcoal to the enclosed space, the charcoal is placed under vacuum for a period of 8 hours at $10^{-4}$ mm Hg at 350°C. The enclosed space is then sealed hermetically by spin welding a polypropylene plug 14 into opening 11 in the manner described in copending application Ser. No. 346,444 filed Mar. 30, 1973. Alternatively, a glass or copper tube can be bonded to the cap about opening 11 prior to the evacuation and then sealed by applying flame to the glass tube or by pinching the copper tube. As an additional sealing technique, the lid portion 2 may be formed such that a tube of the plastic material extends outwardly from opening 11. A hermetic seal can then be achieved by pinching the side walls of tube together while applying heat to fuse the plastic material.

The heat insulating properties of the resultant cap are determined by affixing the cap to a wide-mouth vacuum bottle having a silvered vacuumized glass wide-mouth 16-ounce insert and a plastic liner containing 465 cc of water at about 90°C. The capped bottle is allowed to stand for 10 minutes and the initial temperature ($T_{start}$) is then determined. After 60 minutes from the time of initial temperature the final temperature ($T_{final}$) is measured and the bottle half-life ($t_{1/2}$) is calculated using the following formula:

$$t_{1/2} = (T_{start} + T_{final}) 0.5 - T_{room}/T_{start} - T_{final} \times 0.693 \text{ hours.}$$

The bottle half-life is the time in hours in which one half of the heat calories of the material stored in the bottle are lost to the surrounding environment. For example, the bottle half-life expresses the time taken for a stored hot food having a temperature of 100°C to drop to a value of 62.5°C when room temperature is 25°C. Using the foregoing formula, the instant cap is determined to have a half-life of 9.5 hours.

For the purposes of comparison, the bottle plus a hollow commercial polypropylene cap having a one-fourth inch foam pad insert is similarly tested for heat insulative properties and determined to have a half-life of 7.0 hours.

The increase in half-life time from 7 to 9.5 hours obtained by utilizing the heat insulative cap of the present invention is significant in that the stored food is maintained at a temperature above the food spoiling temperature zone for a longer period of time.

What is claimed is:

1. A vacuum plastic cap comprising encapsulating boundary wall of a normally solid plastic material completely enclosing an evacuated space, a layer of metal on at least one entire surface of said boundary wall, an overcoating of a barrier plastic adherent to the entire metal layer and a gas absorbing material residing in the evacuated space enclosed by the boundary wall to absorb gases present in said evacuated space.

2. The plastic cap of claim 1 wherein the metal layer is on the surface of the boundary wall which is most proximate to the enclosed space.

3. The plastic cap of claim 1 wherein the barrier plastic exhibits a permeance to gases of the atmosphere of less than about 0.9 cc/100 sq. in./mil/day.

4. The plastic cap of claim 1 wherein the barrier plastic is a vinylidene chloride copolymer.

5. The plastic cap of claim 1 wherein the metal is silver.

6. The plastic cap of claim 1 wherein the gas absorbing material comprises activated charcoal in the form of a solid particulate.

7. The plastic cap of claim 1 wherein the normally solid, plastic material is polypropylene.

* * * * *